June 26, 1928.

E. H. BUNCE ET AL 1,674,947

METALLURGICAL FURNACE

Filed Dec. 10, 1925 3 Sheets-Sheet 3

INVENTORS
Earl H. Bunce and
George T. Mahler
BY
Pennie, Davis, Marvin, & Edmonds
ATTORNEYS Patented June 26, 1928.

1,674,947

UNITED STATES PATENT OFFICE.

EARL H. BUNCE AND GEORGE T. MAHLER, OF PALMERTON, PENNSYLVANIA, ASSIGNORS TO THE NEW JERSEY ZINC COMPANY, OF NEW YORK, N. Y., A CORPORATION OF NEW JERSEY.

METALLURGICAL FURNACE.

Application filed December 10, 1925. Serial No. 74,448.

This invention relates to metallurgical furnaces, and particularly to furnaces for making metallic oxides, such as zinc oxide. The invention has for its object the provision of an improved metallurgical furnace particularly adapted for the manufacture of zinc oxide, or other metallic oxides. A further object of the invention is to provide an improved construction of electric furnace, and more especially an electric furnace adapted for the manufacture of zinc oxide.

The working, or heating chamber, of the improved furnace of the invention, in its preferred form, is lined with graphite blocks having their contacting surfaces machined smooth to provide substantially perfect joints between adjacent blocks. The graphite block lining is preferably surrounded by a layer of tamped, or rammed, carbonaceous material, which in turn is surrounded by a layer of heat-refractory material. The heat-refractory material is preferably surrounded by a metallic casing. This casing is preferably surrounded by a layer of heat-insulating material, and the various layers are confined and maintained in their respective positions in the furnace structure by an outer metallic casing.

The furnace is preferably heated by electric energy, and to this end provision is made for the use of electric resistor electrodes (hereinafter referred to as resistors) at one end of, and within, the heating chamber. These resistors are preferably built of carbon, graphite, or the like, and extend through the furnace arch, into the molten bath in the heating chamber. We prefer to use cylindrical resistors having spiral convolutions cut therein.

As constructed for the manufacture of metallic oxides, such as zinc oxide, the furnace has a vapor conduit leading from the heating chamber, preferably through the top arch or roof thereof, to the exterior atmosphere. The outer end of the vapor conduit is provided with a nozzle extension, which is operatively associated with a gas blast compartment, or windbox, arranged to be supplied with relatively cool oxidizing gas, such as air, and having an appropriate opening, or openings, for directing a blast of gas against the stream of metallic vapor issuing from the vapor conduit, or nozzle extension thereof.

The furnace, in its preferred construction, is further provided with an improved feeding or charging well of refractory material for introducing the metal-bearing material into the heating chamber below the normal operating level of the working charge therein.

Likewise, in its preferred construction, the furnace of the invention is provided with a wearing plate of suitable material which is so placed on the furnace lining that it affords a means of protecting the lining from the impact of materials which are charged through the feeding well into the heating chamber.

Again, in its preferred construction, the furnace is provided with means at the mouth of the vapor conduit, or on the gas blast compartment, for scraping off any accretions which may form thereon.

These and other novel features of the improved metallurgical furnace of the invention will be best understood from the following description taken in conjunction with the accompanying drawings, which illustrate a furnace structure embodying what we now consider the preferred mode of carrying out the various aspects of the invention.

In these drawings:—

Figure 1:
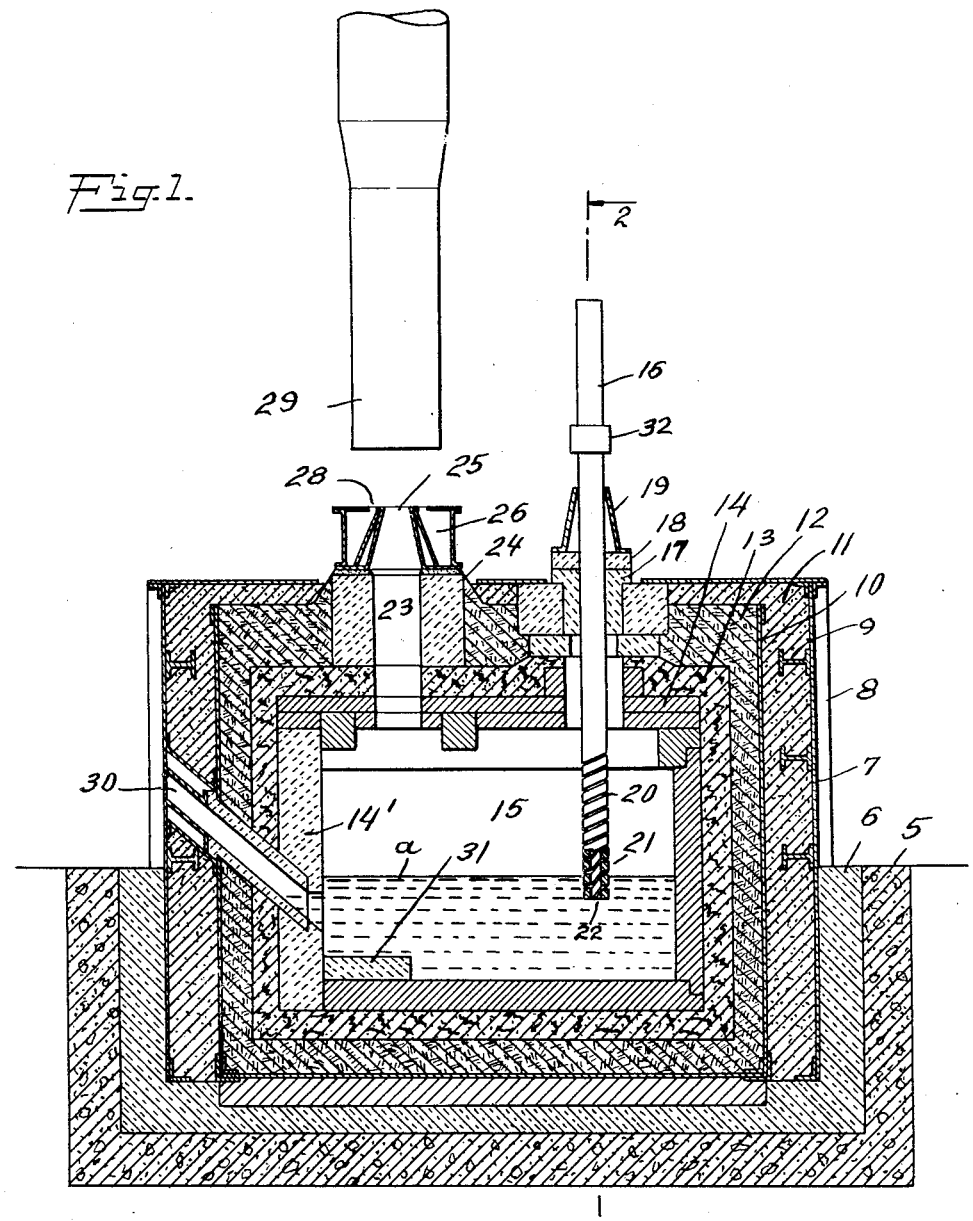
Fig. 1 is a sectional side elevation of an electric furnace particularly adapted for the manufacture of zinc oxide from metallic zinc.
Figure 2:
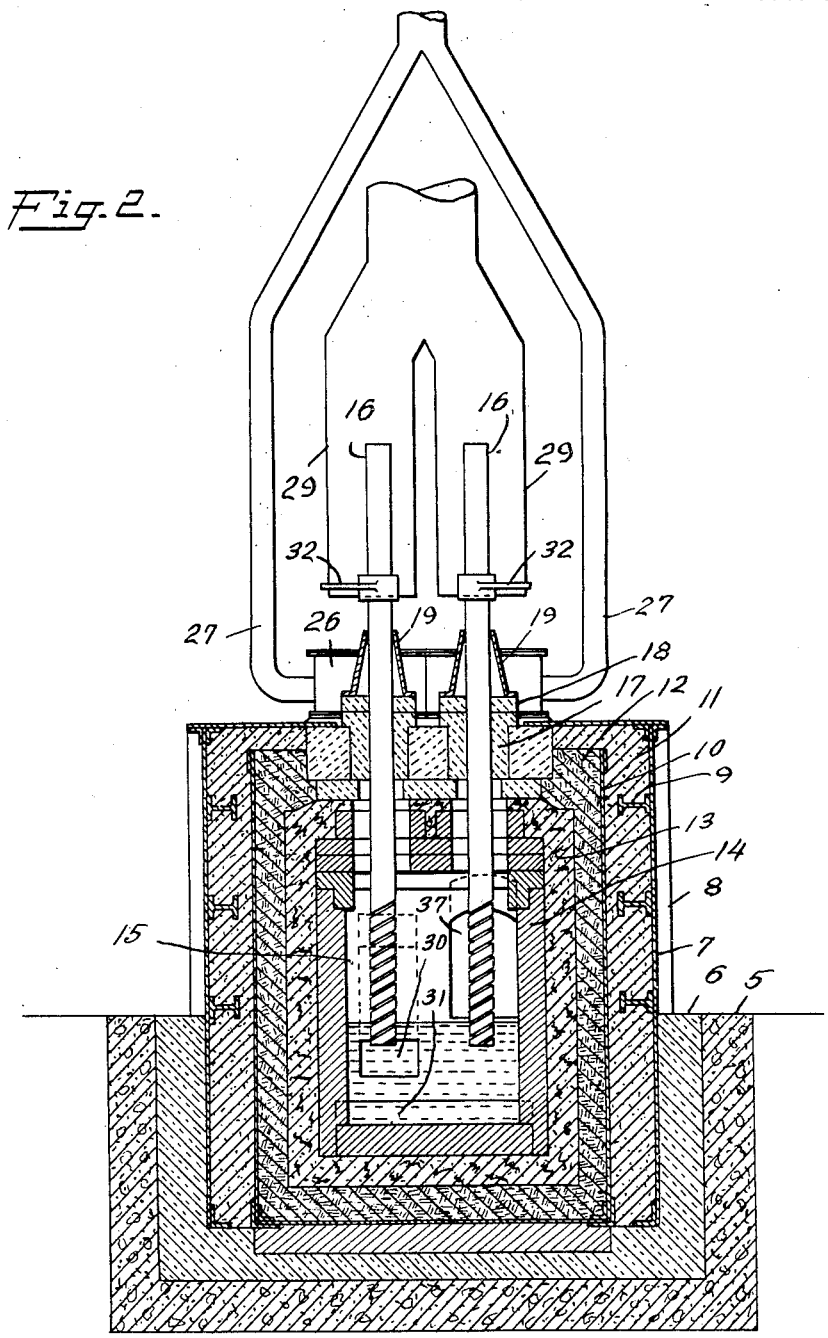
Fig. 2 is a sectional elevation on the section line 2—2 of Fig. 1.

Referring to Fig. 1 of the drawings, the furnace there represented is erected upon a concrete foundation 5. The bottom of this foundation is located some few feet below the floor line, or ground level, and its vertical or side walls extend from the bottom to the floor line. A layer 6 (of appropriate thickness) of heat insulating material, is laid next to the bottom and vertical walls of the foundation.

An outer steel plate casing 7 is mounted adjacent the inner faces of the vertical walls of the heat-insulating layer 6, and extends on all four sides of the furnace from the bottom of the layer 6 to the top of the furnace structure, as well as on the top of the furnace. The casing 7 is supported and strengthened by vertical beams 8, and appropriate tie-rods (not shown), and horizontal beams 9. Within the casing 7, and appropriately spaced therefrom, is an inner casing 10 of steel plate, preferably of box-like construction, having a bottom securely united to the four vertical walls.

The space between the vertical walls of the casings 7 and 10 is filled with heat-insulating material 11, firmly tamped, or rammed, into the space. Within the casing 10, the furnace structure comprises an outer layer 12 of heat-refractory material, an intermediate layer 13 of carbonaceous material, and an inner layer, or lining 14, of machined graphite blocks.

The heat-refractory layer 12 may advantageously consist of dry chromite, or dry magnesite, appropriately rammed, or tamped, into position. The intermediate layer 13 is rammed, or tamped, into position in the form of a carbon paste, being essentially a paste made of anthracite coal, powdered carbon, and pitch. The outer layer 12 of heat-refractory material extends over the top of the furnace, although somewhat thicker than in the vertical walls.

The graphite blocks of the lining 14 are machined so that the contacting surfaces of adjacent blocks are perfectly smooth. In this manner substantially perfect joints are formed between adjacent blocks, and the blocks as a whole form a substantially monolithic graphite lining. The machined graphite block lining may cover the four vertical walls, and the top and bottom, of the heating chamber 15, but in our preferred construction the front wall of the heating chamber is built of heat refractory brick 14'.

The graphite blocks forming the lining 14 may advantageously be about 4 to 6 inches square in section, and from 3 to 4 feet in length. The contacting surfaces (side and ends) of these blocks are machined and the blocks are fitted together with exacting care. Such a construction is of particular advantage in providing efficient heat-conductivity between adjacent blocks.

The furnace structure is conveniently assembled by first constructing the foundation 5 then placing on the foundation an insulating pad for the bottom of the furnace. The metal casings 7 and 10 are next fixed in position and the layer of heat insulating material 6 is placed in position. The bottom of the heat refractory layer 12 is tamped into place. An appropriate mold is then mounted inside the casing 10 for the layer 13 of carbon paste. The machined graphite lining 14 is placed in position and the carbon paste rammed between the mold and the machined graphite lining. The mold is then removed and heat refractory material 12 is rammed between the carbon paste and the inner metallic casing 10. The top or roof of the furnace is next completed, and next the space between the two metallic casings is filled with heat insulating material 11, properly tamped, or rammed into place.

The heating, or working, chamber 15 illustrated in Fig. 1 of the drawings is approximately 6 feet long, 3 feet wide, and 4 feet high. The graphite block lining 14 is, for the most part, about 6 inches in thickness, and the carbonaceous layer 13 and heat-refractory layer 12 are about 6 inches thick except on the top, or roof, where the thickness is preferably somewhat greater. The space between the vertical walls of the casings 7 and 10 is about 10 inches. It will, of course, be understood that these dimensions are given merely by way of example, and are in no sense to be considered as any limitation of the invention.

A pair of spaced resistors 16 extend through the top or roof of the furnace into the heating chamber. Appropriate openings are made in the roof of the furnace for the accommodation of the resistors 16. A gland 17 of refractory material, such as carborundum surrounds each resistor at the top of the furnace, and a ring 18 of carborundum, or the like, is mounted on top of the gland 17. A metallic hat 19 filled with powdered reducing material such as coke, graphite, dust coal, etc. is mounted upon the ring 18. This gland and hat construction is provided to prevent the admission of air into the chamber 15, and to prevent the escape of metallic vapor therefrom.

That portion of the resistors within the heating chamber 15 is provided (for an appropriate length) with spiral convolutions 20. It will be understood that the resistors are hollow as at 22, as shown in the cross-section 21, so that the convolutions provide a circuitous path of relatively high resistance for the passage of the electric current, which may be either alternating or direct. The lower end of each resistor extends into the molten bath in the heating chamber, and the electric circuit between the risistors is thereby completed through the molten bath. Terminal connections 32 are provided for the outer ends of the resistors, and these terminals are appropriately connected to the source of electric energy.

A pair of vapor conduits 23 extend through the roof of the furnace and permit the flow of metallic vapor from the chamber 15 to the exterior atmosphere. Each of these conduits is formed by a circular opening in the top wall of the graphite block lining 14, and a registering tube 24 of refractory material, such as carborundum, or the like. Above the top of the furnace the vapor conduit 23 is continued by a nozzle extension 25, also of refractory material. In the furnace illustrated in Fig. 1, each vapor conduit 23 is about 9 inches in diameter and the nozzle 25 tapers from this dimension at the bottom to about 5 inches at the top.

Mounted on top of the furnace, and surrounding each nozzle 25, is a circular compartment 26 adapted to be supplied with blast air, or other appropriate gas, from any suitable source through a supply pipe 27. The compartment 26 has a circular opening 28 in its top, which opening is slightly larger than, and approximately at the level of, the discharge opening of the nozzle 25. The products of the oxidation of the metallic vapor pass up through the flue or down-legs 29 into appropriate collecting means (not shown).

A charging well 30 extends through the front wall of the furnace into one end of the heating chamber 15. The charging well is preferably in the form of a tube of refractory material, such as graphite, carborundum or the like. The well 30 terminates below the normal operating level of the working charge of molten metal in the chamber 15. Appropriate means are employed to keep the mouth of the well 30 closed, except at the times when feeding material is charged into the chamber 15. The charging well 30 may, if desired, be built into the furnace structure in various other manners. In the furnace illustrated in the drawings, the charging well is rectangular in section so as to conveniently provide for the charging of slab zinc. Other configurations may of course be employed.

A wearing plate 31 of suitable heat resisting material is mounted on the graphite lining 14 at the bottom of the chamber 15 in such a position that it protects the graphite lining 14 from impact with the slabs of zinc charged through the feeding well 30 into the chamber proper. In the furnace illustrated in the drawings, the wearing plate is 42 inches long, 18 inches wide, and 4 inches thick. It is of course to be observed that any other suitable protective plate might be used without departing from the spirit of our invention.

Figure 3:
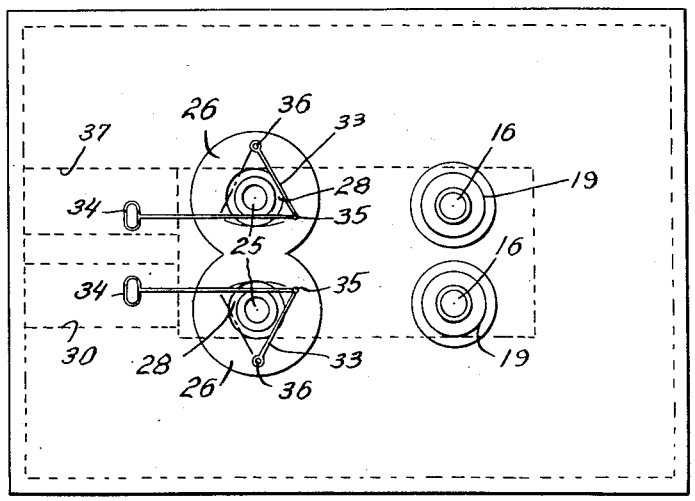
Fig. 3 is a top plan view showing the arrangement of the scrapers.
Figure 4:
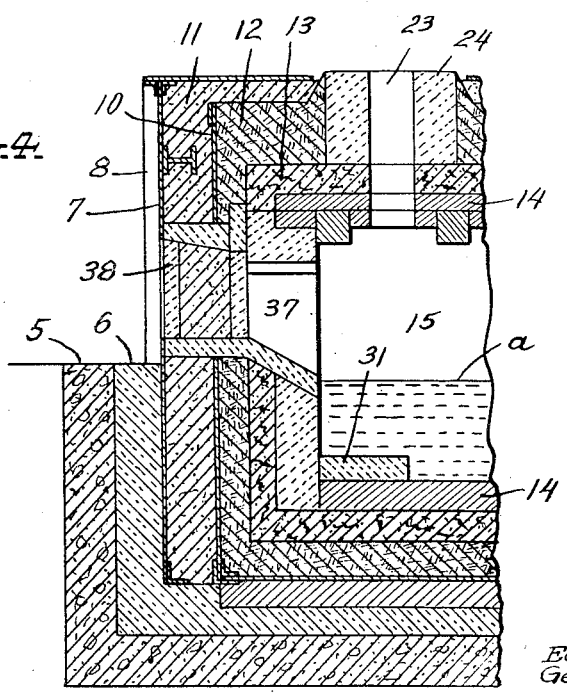
Fig. 4 is a detail sectional elevation through the clean-out door leading into the heating chamber.

Referring to Fig. 3 of the drawings, there is shown a scraping mechanism 33 which is operated by hand, with the aid of a lever and handle 34 pivoted to the scraper 33 at 35; the scraper 33 being pivotally attached to the gas blast compartment 26 at 36. Any accretions which may form at the mouth of the vapor conduit 25, or upon the wind-box 26, are removed from time to time by the manual or mechanical operation of this scraping mechanism.

The front of the furnace is provided with a clean-out opening 37. The opening 37 is cased with appropriate heat-refractory material such as magnesite brick, carborundum brick, or the like. In the normal operation of the furnace, this opening is closed or filled with suitable brick, or the like 38, to maintain the required heat-insulating and heat-refractory characteristics of the furnace. The door or opening 37, is principally used for cleaning out the furnace or for inspection of the condition of the interior of the furnace when the power is turned off.

The operation of the furnace in manufacturing zinc oxide from metallic zinc is as follows: Metallic zinc, preferably in the form of slabs, is introduced into the heating chamber 15 through the feed well 30, until the chamber is filled with molten zinc to about the level indicated by the line $a$, Fig. 1, and this approximate level is maintained in the normal operation of the furnace. The passage of the electric current through the spiral convolutions of the resistors 16 develops sufficient heat to melt the freshly charged metal and to maintain the molten zinc within the chamber at such an elevated temperature as to provide the flow of a steady stream of metallic zinc vapor through the vapor conduits 23.

The space between the top surface of the molten zinc in the chamber 15 and the roof of the chamber becomes filled with metallic zinc vapor and this vapor passes through, and is discharged from, the conduit 23 in a steady stream. As the zinc vapor issues from the nozzle 25 it comes in contact with the surrounding air, and, if uninfluenced, it would burn or oxidize, with the characteristic natural zinc flame. The opening 28 in the top of the blast air compartment 26 directs an annular, or circumferential, blast of relatively cool air inwardly against the escaping stream of zinc vapor and causes its intense combustion, or oxidation.

The effect of this air blast is to radically reduce the size of the combustion or oxidizing zone from the size which it would have if the zinc vapor were burning free in the air in the absence of the air blast. The annular air blast has the further effect of lowering the temperature of the combustion zone and instantly chilling and removing the initially very fine particles of zinc oxide from the region of even slightly elevated temperature prevailing in the combustion zone. The zinc oxide particles thus formed are drawn into the lower end of the downlegs 29 by means of a suction fan, or the like (not shown) in the flue system and are conveyed through the flue system to a baghouse, or to other appropriate means for the collection of the zinc oxide.

Excellent results have been secured in the apparatus illustrated in the accompanying drawings under the following operating conditions: The heating chamber 15 contained approximately 14,000 pounds of molten zinc. The heating of the zinc was effected with an electric current of about 3,000 amperes with an alternating potential across the resistors 16 of about 77 volts, with substantially unity power factor. About 11,000 pounds of metallic zinc were distilled off and passed through the conduits 23 per 24 hours. About 1,000 cubic feet of air per minute at a pressure of about 10 inches of water were supplied to each gas blast compartment 26. The lower end, or hood, of the flue, or down-leg 29, was 18 inches in diameter and was mounted about 12 inches above the discharge end of the nozzle 25. The temperature of the stream of gases entering the lower end of the flue 29 varied from about 100° C., near its center, to about 60° C., at its outside, or periphery.

The use of the spiral cut resistor electrodes depending into the molten bath, as distinguished from other methods of internal electric heating—such as the arc type of electrode or the spiral cut electrode resting on a graphite bench and not dipping into the molten bath, has many advantages. Some of these are the greater steadiness of current consumption and, consequently, heat generation and a unity, or approximately unity, power factor. The fact that the resistors vary in resistance as the metal level rises or falls permits the ammeter to serve as an accurate gauge, readable from the outside, of the quantity of metal in the bath.

The ability to vary the resistance in this way is taken advantage of to vary the power consumed by the furnace simply by raising or lowering the metal in the bath rather than raising or lowering the electrodes themselves.

All these advantages combine to give a much greater life to this type of electrode than any other type used in this kind of furnace.

While we have described a specific construction of metallurgical furnace, to illustrate our invention, it is to be understood that such description is merely by way of example, since the invention may be embodied in various furnace structures.

We claim:

1. A metallurgical furnace comprising a heating chamber, means for feeding charge material into the furnace without the admission of air, means for heating the chamber from within, including a pair of spiral resistors depending into the molten bath in the chamber, and a vapor conduit associated with said chamber for conducting metallic vapor from the chamber.

2. A metallurgical furnace comprising a heating chamber, a vapor conduit associated with said chamber for conducting metallic vapor from the chamber, means for directing a blast of relatively cool gas against the metallic vapor issuing from said conduit, and means for removing accretions from the mouth of said conduit.

3. In a zinc oxide furnace having a heating chamber and a vapor conduit associated therewith for conducting metallic zinc vapor from the chamber to a zinc-oxide-forming environment, a gas compartment operatively associated with the discharge end of said conduit having an opening therein adapted to direct a blast of relatively cool oxidizing gas against the metallic zinc vapor issuing from said conduit, and means for removing accretions from the mouth of said conduit.

4. In a zinc oxide furnace having a heating chamber and a vapor conduit associated therewith for conducting metallic zinc vapor from the chamber to a zinc-oxide-forming environment, means for charging metallic zinc into the heating chamber, means for heating said chamber including a pair of spaced resistors depending into the molten metal in said chamber, means for protecting the heating chamber lining from the impact of the metallic zinc charged therein, a gas compartment operatively associated with the discharge end of said conduit and having an opening therein adapted to direct a blast of relatively cool oxiding gas against the metallic zinc vapor issuing from said conduit, and means for removing accretions from the mouth if said conduit.

5. A metallurgical furnace comprising a chamber for containing a molten bath, a charging well extending inwardly and downwardly through a wall of said chamber and having its discharge end disposed below the normal level of molten bath maintained within said chamber, and a wear resisting member positioned below the discharge end of said charging well and adapted to protect the lining of said chamber from impact with charge introduced into said chamber.

6. A metallurgical furnace comprising a chamber containing a molten bath, and spaced resistors extending into said bath, said resistors having spiral convolutions for providing a circuitous path for the passage of electric current.

7. A metallurgical furnace comprising a chamber for containing metal, heating means for vaporizing metal contained within said chamber, a passage for conducting the metallic vapor from said chamber to an oxidizing environment, and means associated with said passage for removing accretions therefrom.

In testimony whereof we affix our signatures.

EARL H. BUNCE.
GEORGE T. MAHLER.